(12) United States Patent
Vasilescu

(10) Patent No.: US 7,484,568 B2
(45) Date of Patent: Feb. 3, 2009

(54) SOIL AERATION AND CULTIVATION TINE

(75) Inventor: Constantin Vasilescu, Kitchener (CA)

(73) Assignee: Holland Equipment Limited, Norwich, Ontario (CA)

( * ) Notice: Subject to any disclaimer, the term of this patent is extended or adjusted under 35 U.S.C. 154(b) by 425 days.

(21) Appl. No.: 10/939,193

(22) Filed: Aug. 27, 2004

(65) Prior Publication Data

US 2005/0077059 A1 Apr. 14, 2005

(51) Int. Cl.
*A01B 45/00* (2006.01)
(52) U.S. Cl. .................... 172/21; 172/122; 172/540
(58) Field of Classification Search .............. 172/21, 172/122, 123, 540, 545, 554, 557, 22; D23/377
See application file for complete search history.

(56) References Cited

U.S. PATENT DOCUMENTS

| 260,342 | A | * | 6/1882 | Williamson | 172/540 |
| 545,545 | A | * | 9/1895 | Spitzenberg | 172/540 |
| 1,858,749 | A | * | 5/1932 | Paterson et al. | 172/71 |
| D263,233 | S |   | 3/1982 | Van der Lely | |
| 4,383,580 | A |   | 5/1983 | Huxford | |
| 4,467,874 | A |   | 8/1984 | Wittrock | |
| 4,840,232 | A |   | 6/1989 | Mayer | |
| D483,464 | S | * | 12/2003 | Tai | D23/377 |
| D485,609 | S | * | 1/2004 | Tai | D23/377 |
| 6,691,791 | B2 |   | 2/2004 | Bjorge | |
| 6,854,525 | B2 | * | 2/2005 | Martindale | 172/21 |
| 6,923,266 | B1 | * | 8/2005 | McLeod | 172/21 |

* cited by examiner

*Primary Examiner*—Thomas B Will
*Assistant Examiner*—Jamie L McGowan
(74) *Attorney, Agent, or Firm*—Gowling Lafleur Henderson LLP; D. Doak Horne

(57) ABSTRACT

A tine for mounting on a rotatable shaft of soil aeration and cultivation equipment, comprising: mounting means at an attachment end of the tine; a tip at a ground-engaging end of the tine opposite the attachment end; leading and trailing convex curvilinear edges disposed opposite each other and converging toward the attachment end and the tip; and bevelled sections on each of the leading and trailing convex curvilinear edges. The unique shape of the tine has been found to create a wider range of soil disturbance than is the case with conventional straight-edge tines, requires less material to manufacture, and penetrates the ground surface more easily than conventional straight-edge tines due to the convex leading edge.

65 Claims, 8 Drawing Sheets

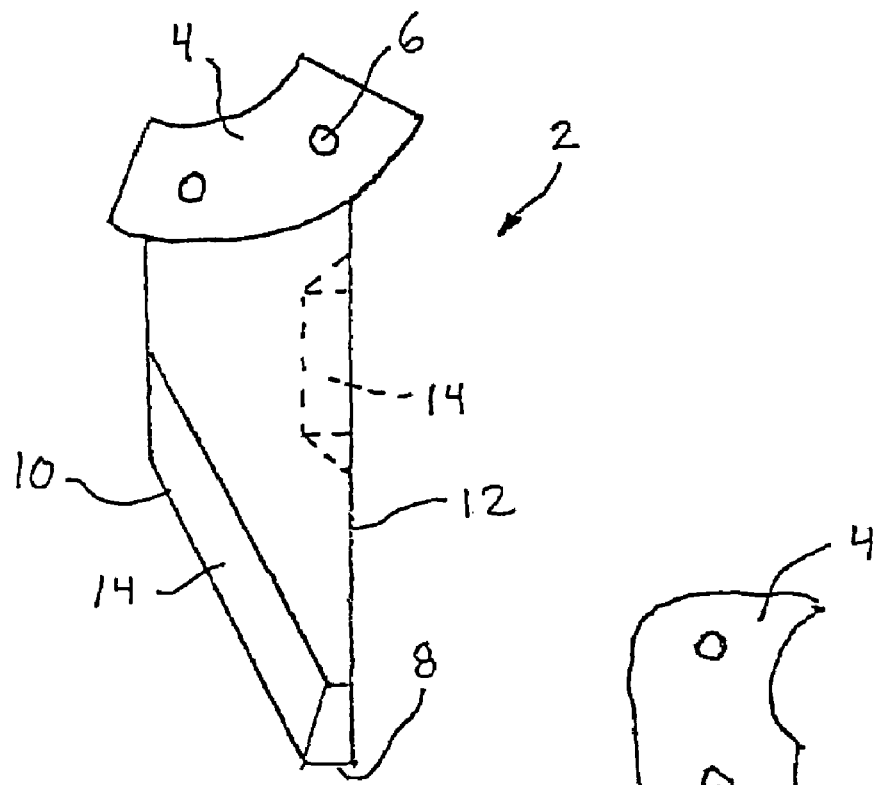
FIG. 1 – PRIOR ART
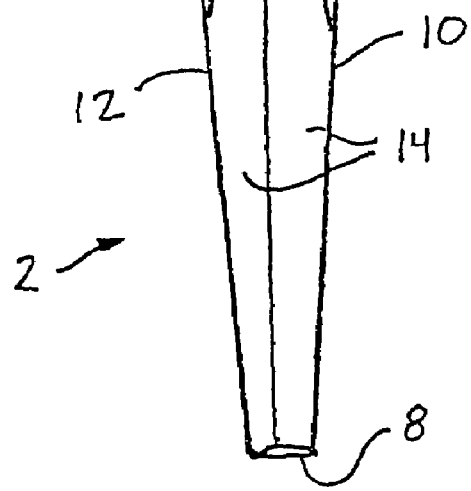
FIG. 2 – PRIOR ART

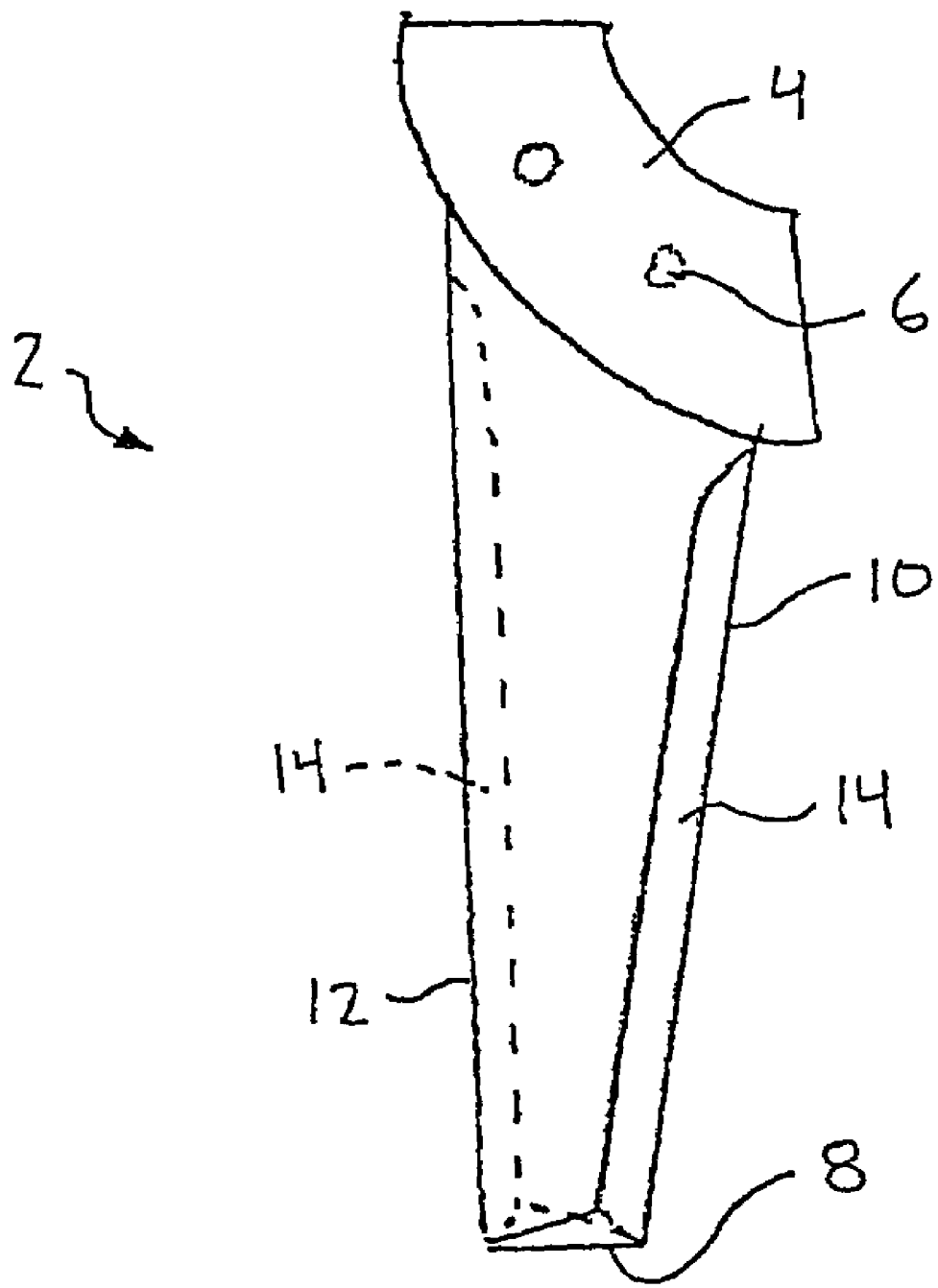
FIG. 3 – PRIOR ART

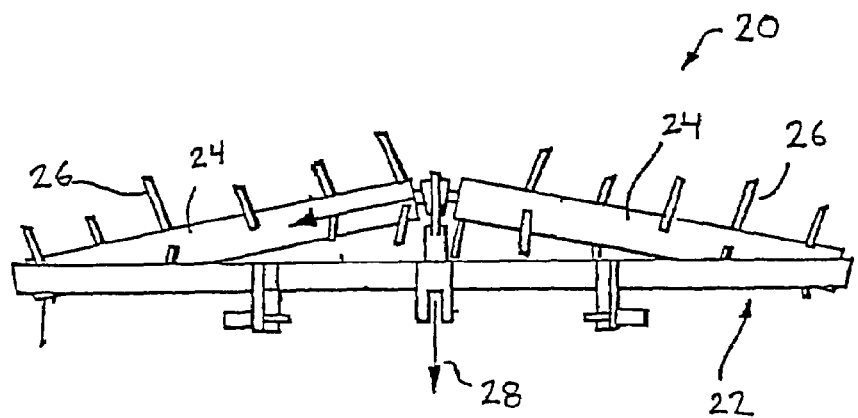
FIG. 4 – PRIOR ART
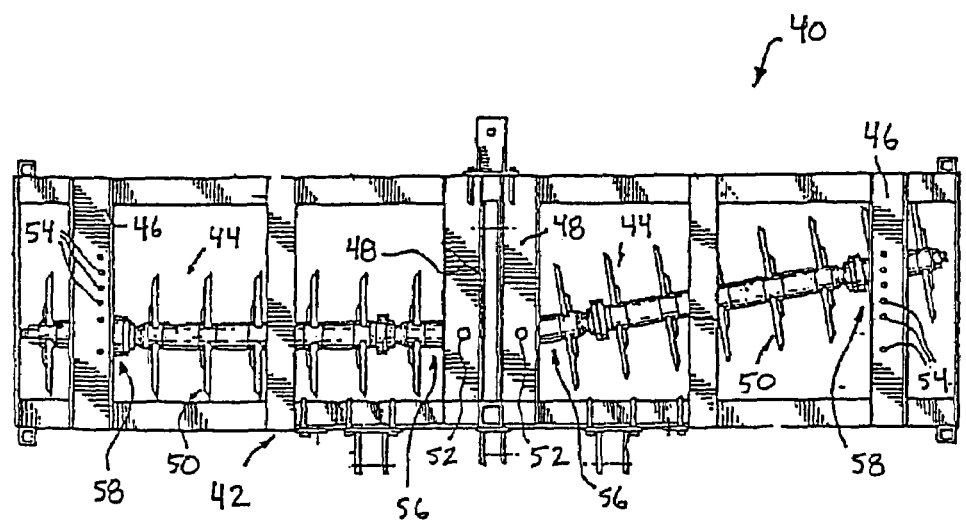
FIG. 5 – PRIOR ART

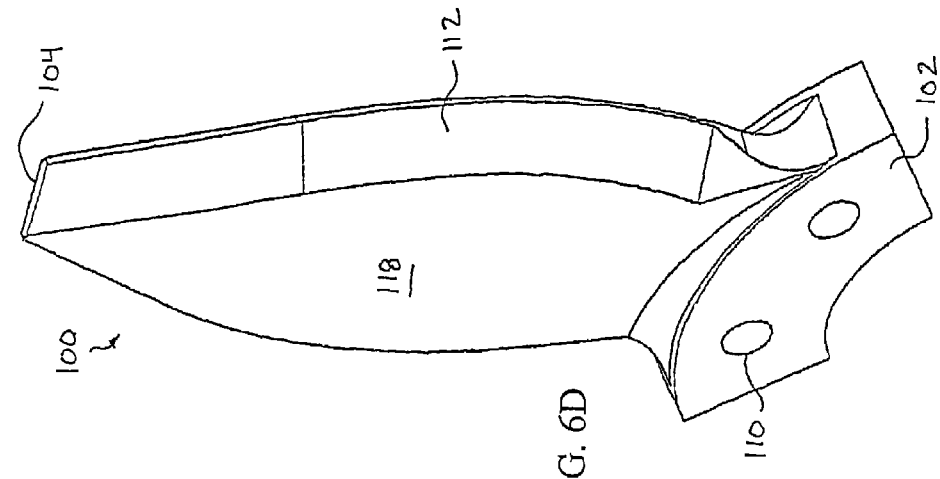
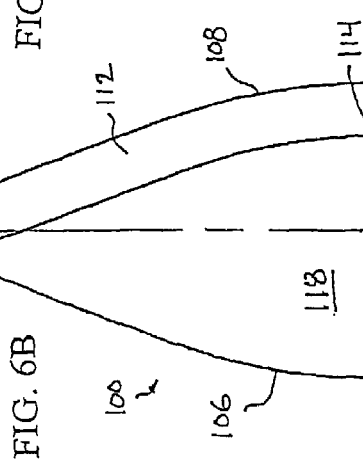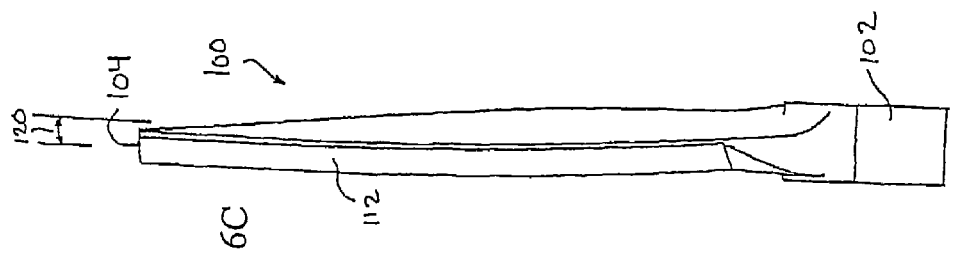
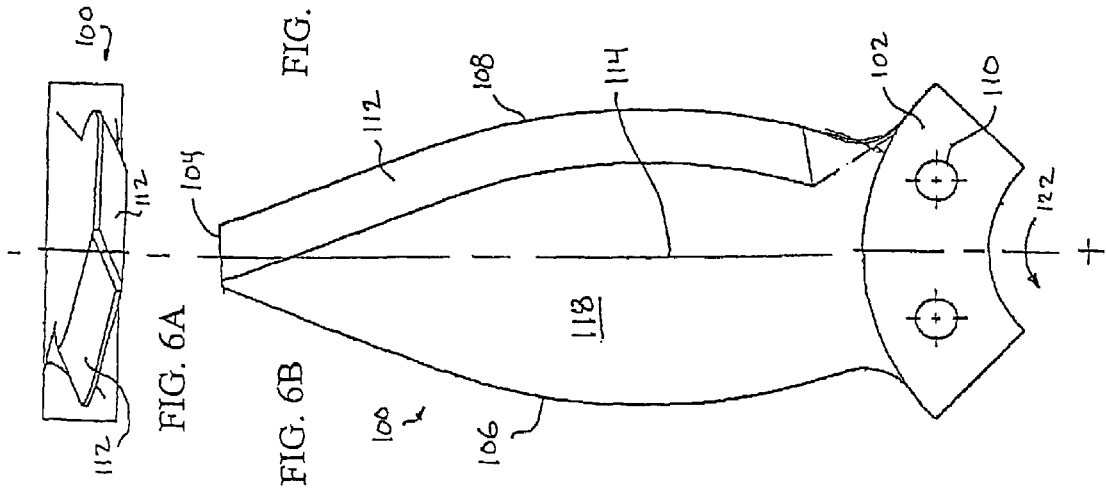
FIG. 6A
FIG. 6B
FIG. 6C
FIG. 6D

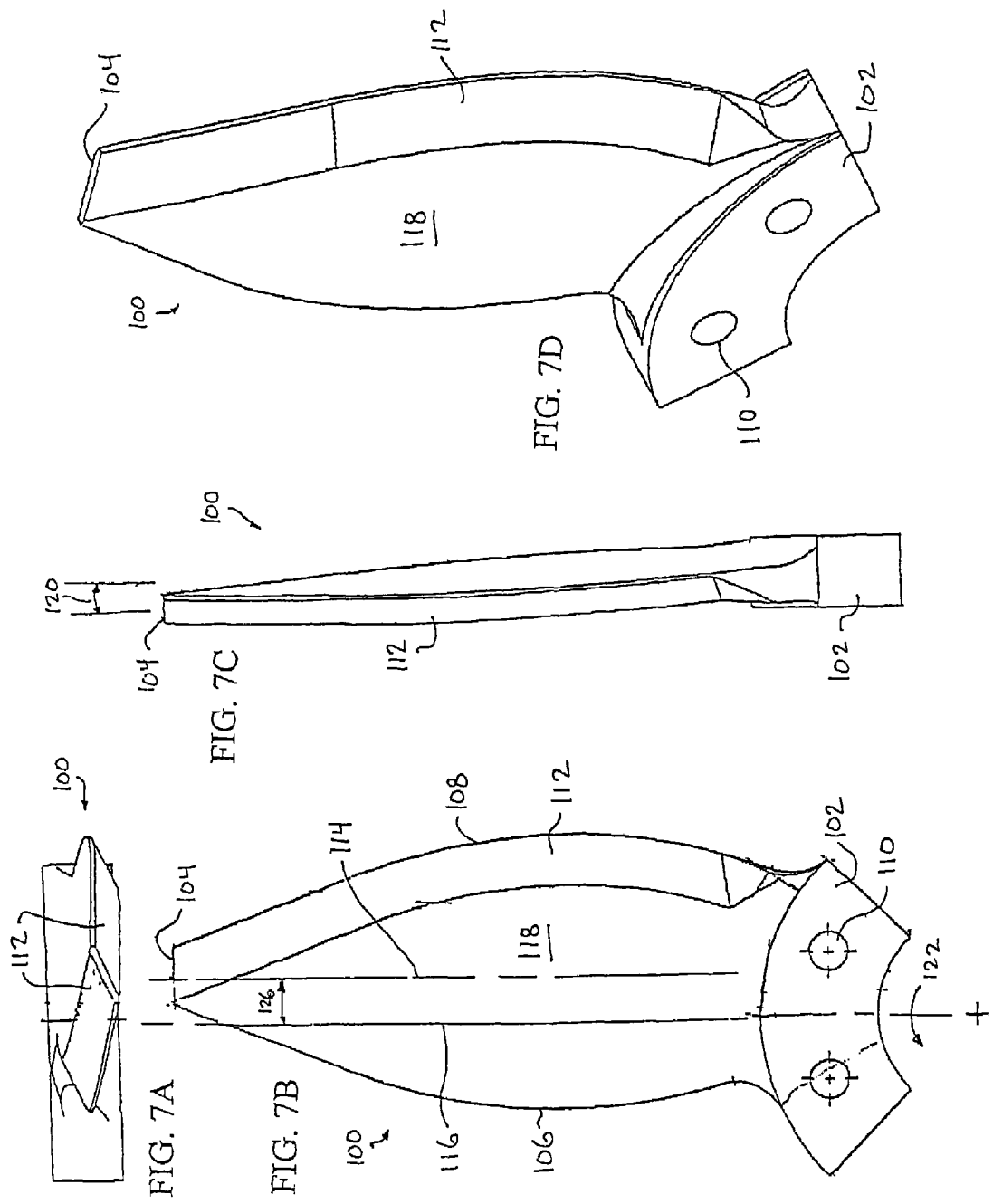

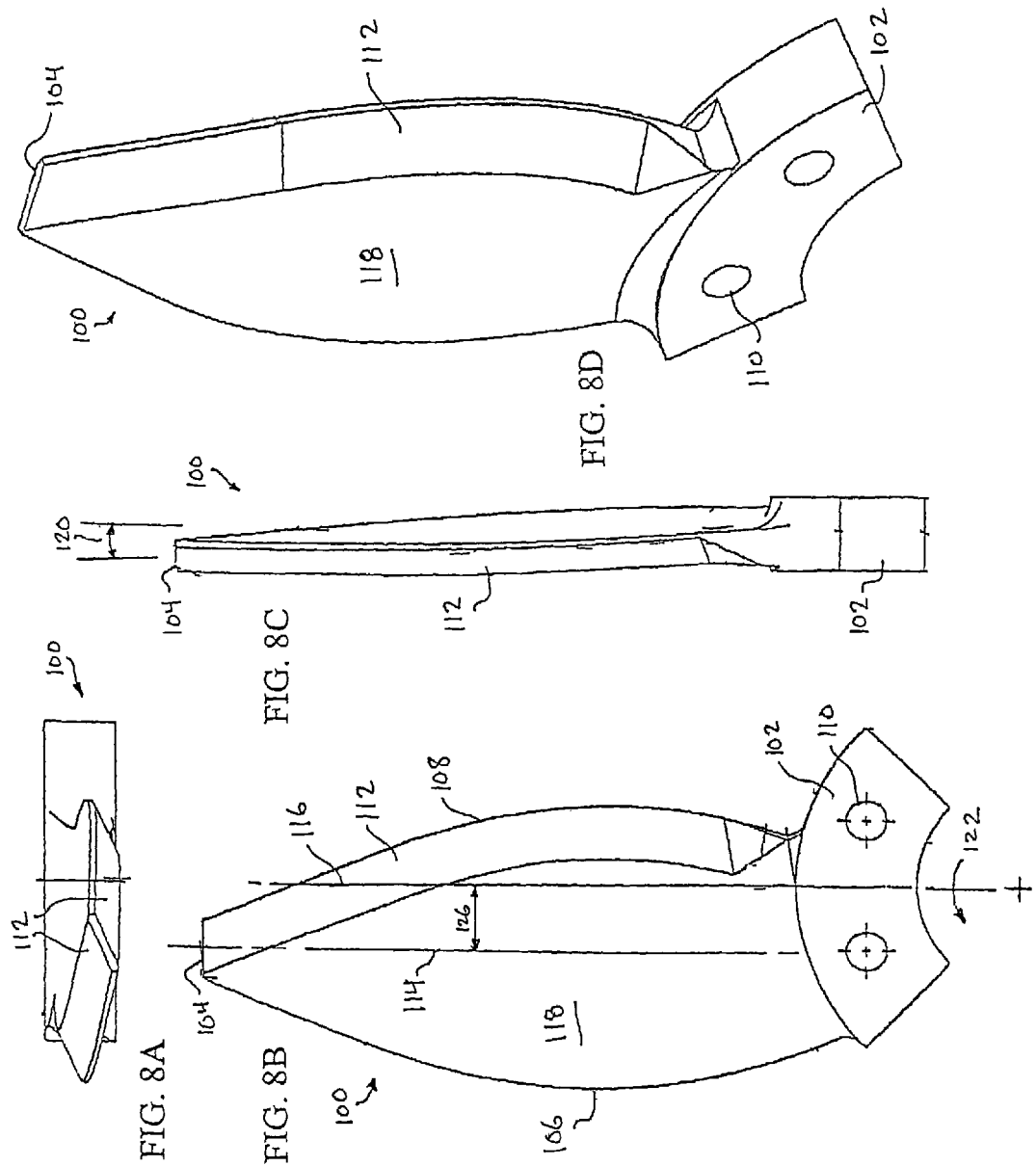

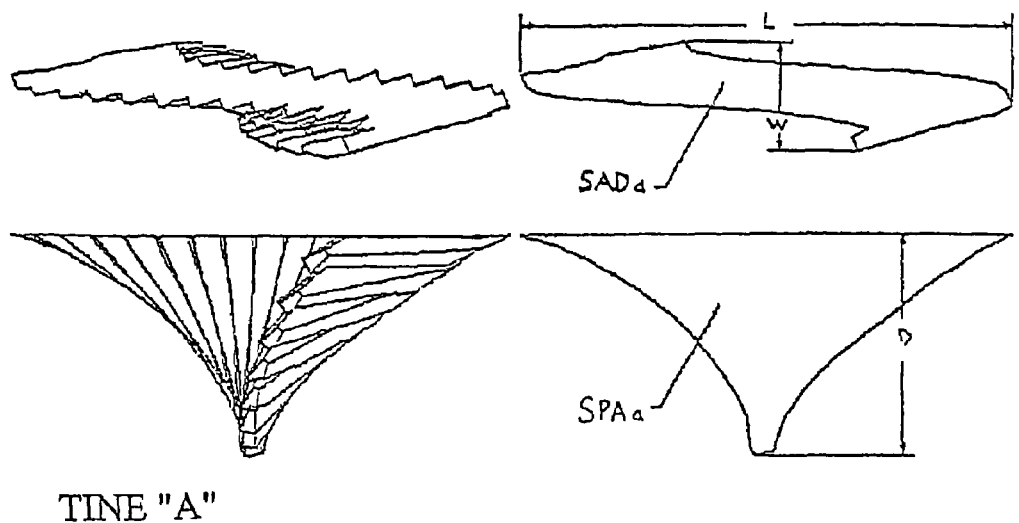
TINE "A"
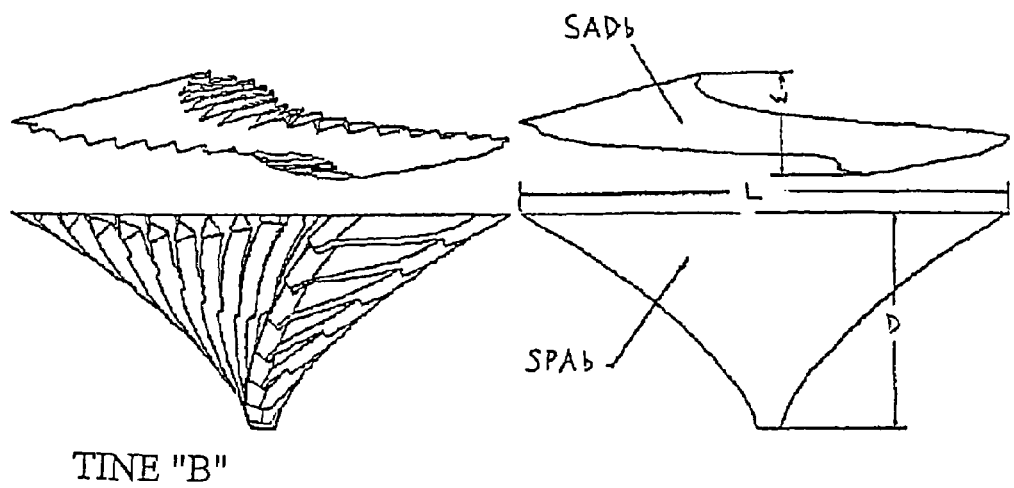
TINE "B"
FIG. 10

SOIL AERATION AND CULTIVATION TINE

FIELD OF INVENTION

The present invention relates generally to soil aeration and cultivation equipment, and more particularly to ground-penetrating tines used with such equipment.

BACKGROUND OF THE INVENTION

The use of tines is well known in the art of soil aeration and cultivation, and a variety of tine shapes have been employed with varying success. The applicant, Holland Equipment Limited, has manufactured tines having a variety of shapes, including commercially known products such as the Shattertine™, Finetine™, and Sportstine™ tines. Tines are commonly comprised of an attachment member for mounting the tine on the appropriate equipment, and a tip at a point distant from the equipment. The tine is provided with a leading edge which penetrates the ground surface upon rotation of the tine due to mounting on a rotatable shaft or roller on the equipment.

There have also been numerous attempts to provide implements or equipment having improved aeration potential, comprising novel tine assemblies and means of manipulating such assemblies. U.S. Pat. No. 4,383,580 to Huxford teaches an implement comprising a frame moveable in a direction of travel, the frame housing two rotatable shafts each having a plurality of tines situated thereon. The rotatable shafts are angled off a line perpendicular to the direction of travel (known as the "swing angle") to cause the shafts to rotate when drawn in the direction of travel. U.S. Pat. No. 4,840,232 to Mayer teaches yet another implement with angled shafts. The Mayer implement comprises a frame having side members and centre members, the rotatable shafts with tine assemblies extending therebetween comprising tines similar to the Shattertine™ tines of the applicant. Each of the inner ends of the shafts in Mayer is in rotatable, pivotable engagement with a centre member by means of a swivel point, and the outer ends communicate with the side members of the frame at one of a plurality of selectable receiving positions, affording the ability to adjust the swing angle of the shafts.

Conventional tines for use with the above devices have been found to provide only a limited range of soil disturbance (in terms of volume and surface area, at various swing angles), even with the various innovative implements that employ them. Creating larger, heavier and thus more costly tines to produce greater soil disturbance results in undesirable manufacturing cost increases. Also, some conventional tine configurations fail to provide a structure that will penetrate the ground surface with ease, resulting in poor or uneven aeration and/or cultivation efforts.

SUMMARY OF THE INVENTION

It is an object of the present invention, therefore, to provide a tine for use with soil aeration and cultivation equipment that provides a greater range of soil displacement options, does not rely on costly size increases of the tine, and provides for ease of ground penetration.

According to a first broad aspect of the present invention, there is provided a tine for mounting on a rotatable shaft of soil aeration and cultivation equipment, comprising: mounting means at an attachment end of the tine; a tip at a ground-engaging end of the tine opposite the attachment end; leading and trailing convex curvilinear edges disposed opposite each other and converging toward the attachment end and the tip; and first and second opposed faces substantially meeting at each of the leading and trailing convex curvilinear edges.

According to a second broad aspect of the present invention, there is provided a rotatable shaft for mounting on soil aeration and cultivation equipment, comprising at least one tine, the at least one tine comprising: mounting means at an attachment end of the at least one tine for mounting the at least one tine on the rotatable shaft; a tip at a ground-engaging end of the at least one tine opposite the attachment end; leading and trailing convex curvilinear edges disposed opposite each other and converging toward the attachment end and the tip; and first and second opposed faces substantially meeting at each of the leading and trailing convex curvilinear edges.

According to a third broad aspect of the present invention, there is provided an apparatus for soil aeration and cultivation comprising at least one rotatable shaft having at least one tine, the soil aeration and cultivation equipment for moving in a direction of travel, the at least one tine comprising: mounting means at an attachment end of the at least one tine for mounting the at least one tine on the at least one rotatable shaft; a tip at a ground-engaging end of the at least one tine opposite the attachment end; leading and trailing convex curvilinear edges disposed opposite each other and converging toward the attachment end and the tip; and first and second opposed faces substantially meeting at each of the leading and trailing convex curvilinear edges.

According to a fourth broad aspect of the present invention, there is provided an apparatus for soil aeration and cultivation comprising at least one rotatable shaft having at least one tine, the soil aeration and cultivation equipment for moving in a direction of travel the at least one tine comprising: mounting means at an attachment end of the at least one tine for mounting the at least one tine on the at least one rotatable shaft; a tip at a ground-engaging end of the at least one tine opposite the attachment end; leading and trailing convex curvilinear edges disposed opposite each other and converging toward the attachment end and the tip; and first and second opposed faces substantially meeting at each of the leading and trailing convex curvilinear edges; wherein the at least one rotatable shaft is disposed at an angle of 0° to 10° to a line perpendicular to the direction of travel.

In exemplary embodiments of the present invention, the tine exhibits a lean and/or a twist, the lean causing the tine to form an angle of 0.5° to 15° (and most preferably 2.5°) with respect to a plane disposed perpendicular to the axis of rotation of the rotatable shaft, and the twist causing the tine to form an angle of 0.5° to 15° (and most preferably 8°) with respect to a plane containing the axis of rotation. A centre line of the tine may pass through the axis of rotation of the rotatable shaft, or the centre line may be offset from a line passing through the axis of rotation (thereby passing forwardly or rearwardly of the line passing through the axis of rotation), and may be parallel to the line passing through the axis of rotation; where the centre line is parallel to the line passing through the axis of rotation, the centre line and the line passing through the axis of rotation are preferably spaced apart by up to 0.75 inches. The leading and trailing convex curvilinear edges may be symmetrical or asymmetrical about the tine centre line. The mounting means comprise at least one bolt hole, and preferably two, for receiving attachment bolts, and the tip may either come to a sharp point or have a flat end. There is preferably, on at least one of the opposed faces, at least one bevelled section adjacent one of the leading and trailing convex curvilinear edges, and the rotatable shaft, where disposed at an angle to a line perpendicular to the direction of travel, may be disposed at a fixed angle or a variable angle. Exemplary embodiments of the present invention may contain any combination of the above features.

The present invention has been found to produce a wider range of ground disturbance options when compared to commercially available tine configurations of similar size and weight, creating greater soil displacement (including volume of soil displaced) when the shafts are angled off of the perpendicular. Advantageously, while displaced soil volume is increased with tines according to the present invention when swing angles are used, surface area disturbance does not increase as much, and is less in most cases than with conventional tines. This has an advantage in reducing moisture loss from the surface, while still allowing deep air penetration. This greater versatility is a significant advantage where an operator is presented with various aeration/cultivation needs. Also, having the convex curvilinear edges converging toward both the attachment end and the tip saves material and therefore manufacturing cost, while producing greater soil disturbance results than some straight-edged tines. Finally, the convex curvilinear leading edge allows the tine to penetrate the ground surface with greater ease than is the case with straight-edged tines, the latter usually presenting a longer penetrating edge than is the case with the former.

A detailed description of exemplary embodiments of the present invention is given in the following. It is to be understood, however, that the invention is not to be construed as limited to these embodiments.

BRIEF DESCRIPTION OF THE DRAWINGS

In the accompanying drawings, which illustrate exemplary embodiments of the present invention:

FIG. 1 is a side elevation view of a first prior art tine;
FIG. 2 is a side elevation view of a second prior art tine;
FIG. 3 is a side elevation view of a third prior art tine;
FIG. 4 is a top plan view of a first prior art implement with fixed shaft swing angles;
FIG. 5 is a top plan view of a second prior art implement with variable shaft swing angles;
FIG. 6A is a top plan view of a tine according to the present invention having zero eccentricity;
FIG. 6B is a side elevation view of the tine of FIG. 6A;
FIG. 6C is a front elevation view of the tine of FIG. 6A;
FIG. 6D is a perspective view of the tine of FIG. 6A;
FIG. 7A is a top plan view of a tine according to the present invention having positive eccentricity;
FIG. 7B is a side elevation view of the tine of FIG. 7A;
FIG. 7C is a front elevation view of the tine of FIG. 7A;
FIG. 7D is a perspective view of the tine of FIG. 7A;
FIG. 8A is a top plan view of a tine according to the present invention having negative eccentricity;
FIG. 8B is a side elevation view of the tine of FIG. 8A;
FIG. 8C is a front elevation view of the tine of FIG. 8A;
FIG. 8D is a perspective view of the tine of FIG. 8A;
FIG. 10 is an example of tine comparison results using solid modelling CAD prediction as discussed herein.

DETAILED DESCRIPTION OF EXEMPLARY EMBODIMENTS

Figure 9A:
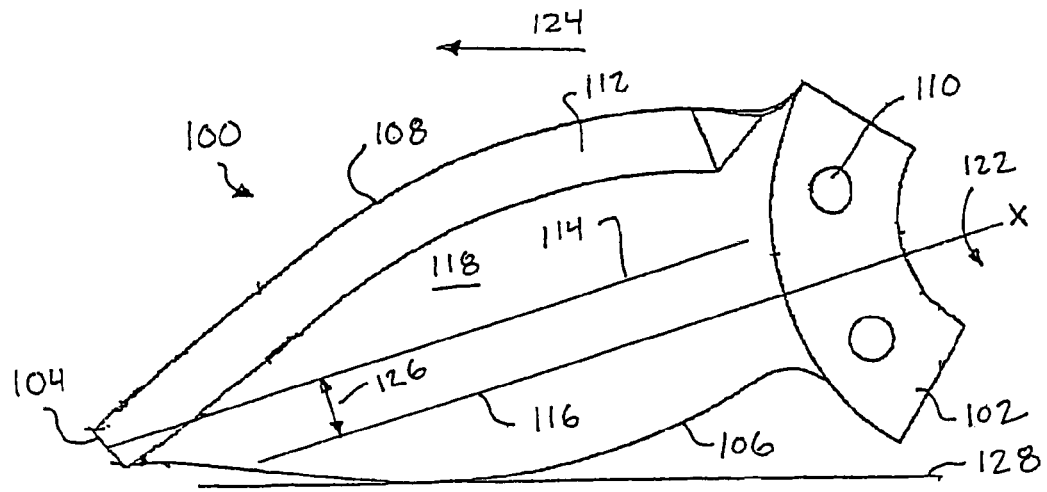
FIG. 9A is a side elevation view of the tine of FIG. 7A in initial contact with the ground surface.

Referring now in detail to the accompanying drawings, some examples of conventional tine configurations are illustrated in prior art FIGS. 1 to 3, manufactured by the applicant and commercially known respectively as the Shattertine™, Finetine™, and Sportstine™ tines. Tines 2 are commonly comprised of an attachment member 4 for mounting the tine 2 on the appropriate equipment (not shown), often by means of bolts (not shown) passing through holes 6 in the attachment member 4, and a tip 8 at a point distant from the equipment. The tine 2 is provided with a leading edge 10, which penetrates the ground surface upon rotation of the tine 2 due to mounting on a rotatable shaft or roller (not shown) on the equipment. The tine 2 further typically comprises a trailing edge 12 and bevelled sections 14 to ease ground penetration and passage therethrough.

As stated above, there have also been numerous attempts to provide implements or equipment having improved aeration potential, comprising novel tine assemblies and means of manipulating such assemblies, as can be seen in prior art FIGS. 4 and 5. FIG. 4 is derived from U.S. Pat. No. 4,383,580 to Huxford, and it illustrates an implement 20 comprising a frame 22 moveable in a direction of travel 28. The frame 22 houses two rotatable shafts 24 each having a plurality of tines 26 situated thereon. The rotatable shafts 24 are angled off a line perpendicular to the direction of travel 28 (known as the "swing angle") to cause the shafts 24 to rotate when drawn in the direction of travel 28. FIG. 5 is derived from U.S. Pat. No. 4,840,232 to Mayer, illustrating yet another implement with angled shafts. The Mayer implement 40 comprises a frame 42 having side members 46 and centre members 48, the rotatable shafts 44 with tine assemblies 50 extending therebetween comprising tines similar to the Shattertine™ tines of the applicant. Each of the inner ends 56 of the shafts 44 in Mayer is in rotatable, pivotable engagement with a centre member 48 by means of a swivel point 52, and the outer ends 58 communicate with the side members 46 of the frame 42 at one of a plurality of selectable receiving positions 54, affording the ability to adjust the swing angle of the shafts 44.

Referring now to FIGS. 6A to 8D, there are illustrated exemplary embodiments of a tine according to the present invention for mounting on a rotatable shaft (not shown, but reference may be made to prior art FIGS. 4 and 5) of soil aerating and cultivating equipment (not shown, but reference may be made to prior art FIGS. 4 and 5), the tine generally referred to by the numeral 100. The tine 100 comprises an attachment section 102, a tip 104 at a ground-engaging end of the tine 100 opposite the attachment section 102, leading and trailing convex curvilinear edges 106, 108 disposed opposite each other and converging toward the attachment section 102 and the tip 104, and bevelled sections 112 disposed on opposite faces 118 of the tine 100 adjacent each of the leading and trailing convex curvilinear edges 106, 108. The attachment section 102 comprises holes 110 for receiving attachment bolts (not shown), which bolts are commonly used in the art to secure tines to the shafts of soil aerating and cultivating equipment.

FIGS. 6A to 6D illustrate an exemplary embodiment wherein there is zero eccentricity, in other words, where the centre line 114 of the tine 100 is coincident with a line extending perpendicular to the axis of rotation of the rotatable shaft. The direction of rotation is referenced by numeral 122. In this exemplary embodiment, a lean 120 of about 2.5° is illustrated, with a twist of about 7.5°.

FIGS. 7A to 7D illustrate an exemplary embodiment wherein there is positive eccentricity, in other words, where the centre line 114 of the tine 100 is disposed rearwardly of a line 116 extending perpendicular to the axis of rotation of the rotatable shaft in relation to the direction of rotation 122. In this exemplary embodiment, a lean 120 of about 2.5° is illustrated, with a twist of about 7.5° and positive eccentricity 126 of about 0.75 inches.

FIGS. 8A to 8D illustrate an exemplary embodiment wherein there is negative eccentricity, in other words, where the centre line 114 of the tine 100 is disposed forwardly of a line 116 extending perpendicular to the axis of rotation of the rotatable shaft in relation to the direction of rotation 122. In this exemplary embodiment, a lean 120 of about 2.5° is illustrated, with a twist of about 7.5° and negative eccentricity 126 of about 0.75 inches.

Figure 9B:
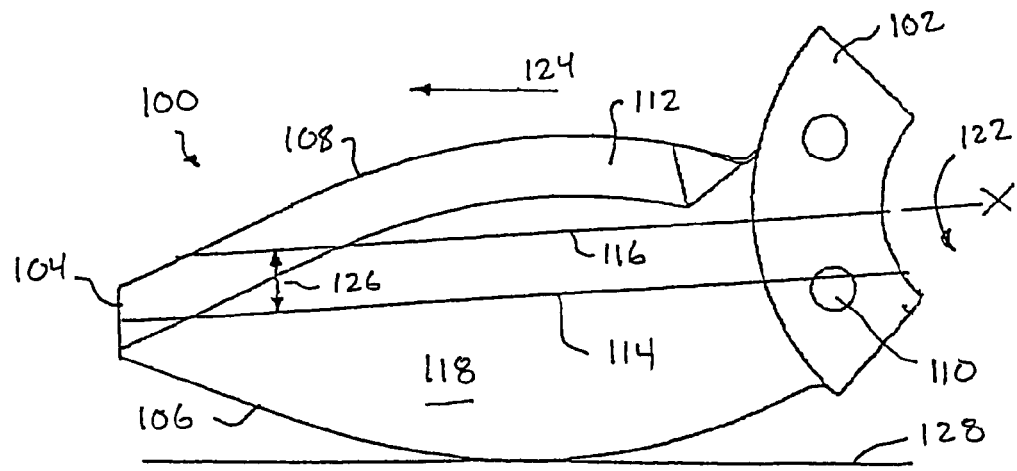
FIG. 9B is a side elevation view of the tine of FIG. 8A in initial contact with the ground surface.

FIGS. 9A and 9B illustrate the approach of exemplary embodiments of the present invention toward a ground surface 128. FIG. 9A illustrates a tine 100 having positive eccentricity 126 moving in a direction of travel 124, while FIG. 9B illustrates a tine 100 having negative eccentricity 126. As the rotatable shaft rotates in the direction of rotation 122, the leading edge 106 penetrates the ground surface 128 at a small entry point (unlike some conventional straight-edged tines), the surface penetration area lengthening as the tine 100 penetrates more deeply.

comparison, and avoided problems in physical comparison including variable soil properties such as soil type, moisture content, and residue. Due to the undesirable complicating effects of these factors, testing was conducted by means of three-dimensional computer modelling to eliminate the effects of soil conditions. An example of solid modelling CAD prediction results is set out in FIG. 10, for illustrative purposes only, comparing a commercially available tine (Tine "A") to a tine according to the present invention (Tine "B") with the same tine dimensions; SADa is the surface area disturbance and SPAa is the side profile area for Tine "A", while SADb is the surface area disturbance and SPAb is the side profile area for Tine "B", with dimensions "L" (length), "W" (width) and "D" (depth) providing computer-generated predictive measurements (volume of soil displacement was also generated but is not shown on FIG. 10).

The following table presents the results of the comparison testing, wherein VSD is the volume of soil displacement, SAD is the surface area disturbance, and SPA is the side profile area of the soil disturbance:

| Swing Angle | Prior Art Tine A | | | Tine 100 | | |
| --- | --- | --- | --- | --- | --- | --- |
| | VSD | SAD | SPA | VSD | SAD | SPA |
| 0° | 37.48 in$^3$ | 13.98 in$^2$ | 50.7 in$^2$ | 34.35 in$^3$ | 12.4 in$^2$ | 59.73 in$^2$ |
| 1° | 39.87 in$^3$ | 14.53 in$^2$ | 50.64 in$^2$ | 37.02 in$^3$ | 12.89 in$^2$ | 59.64 in$^2$ |
| 2° | 43.35 in$^3$ | 15.37 in$^2$ | 50.7 in$^2$ | 41.14 in$^3$ | 13.92 in$^2$ | 59.67 in$^2$ |
| 3° | 47.54 in$^3$ | 16.52 in$^2$ | 50.73 in$^2$ | 45.91 in$^3$ | 15.14 in$^2$ | 59.74 in$^2$ |
| 4° | 51.87 in$^3$ | 17.72 in$^2$ | 50.81 in$^2$ | 51.09 in$^3$ | 16.5 in$^2$ | 59.83 in$^2$ |
| 5° | 56.31 in$^3$ | 18.93 in$^2$ | 51.07 in$^2$ | 57.33 in$^3$ | 18.16 in$^2$ | 60.17 in$^2$ |
| 6° | 60.81 in$^3$ | 20.15 in$^2$ | 50.86 in$^2$ | 62.35 in$^3$ | 19.54 in$^2$ | 59.83 in$^2$ |
| 7° | 65.38 in$^3$ | 21.43 in$^2$ | 50.99 in$^2$ | 68.24 in$^3$ | 21.12 in$^2$ | 59.96 in$^2$ |
| 8° | 69.95 in$^3$ | 22.74 in$^2$ | 50.95 in$^2$ | 74.21 in$^3$ | 22.69 in$^2$ | 60.12 in$^2$ |
| 9° | 74.47 in$^3$ | 24.04 in$^2$ | 51.1 in$^2$ | 80.15 in$^3$ | 24.26 in$^2$ | 60.1 in$^2$ |
| 10° | 78.92 in$^3$ | 25.34 in$^2$ | 51.41 in$^2$ | 86.77 in$^3$ | 26.03 in$^2$ | 61.81 in$^2$ |

The utility of the present invention becomes clear with reference to the following example.

EXAMPLE

A comparison was made of the soil displacement potential of a tine 100 according to the present invention (a model no. XE-65946-01, the "left-handed" model, developed by the applicant) and a commercially available prior art "Tine A" (a standard Shattertine™ model no. XE-53655-01, the "left-handed" model, developed by the applicant), Tine A being comparable to the tine illustrated in prior art FIG. 1 (FIG. 1 illustrating a "right-handed" model, however). The two tines Tine A and tine 100 were of comparable size and application (having a similar blade length and weight). The prior art Tine A had the following characteristics: blade length of 8 inches, −0.1 inch eccentricity, 2.5° lean, 8° twist, and a weight of 4.6 pounds. Tine 100 had the following characteristics: blade length of 8 inches, zero eccentricity, 2.5° lean, 8° twist, and a weight of 4.3 pounds. The compared tines were therefore roughly equivalent in size, orientation, and weight, with only a very slight difference in eccentricity, and they were compared using swing angles of 0° to 10°.

To evaluate the physical soil displacement and to avoid inaccuracies in physical soil measurement, tine pocket characteristics were predicted (e.g. total volume disturbance, surface area disturbance, and side profile area) using solid modelling CAD prediction. This allowed more precise The following table presents the percentage difference between the two compared tines, based on the above results ((tine 100 result 4 Tine A result) 3 100%=percentage difference):

| Swing Angle | VSD | SAD | SPA |
| --- | --- | --- | --- |
| 0° | 91.65% | 88.70% | 117.81% |
| 1° | 92.85% | 88.71% | 117.77% |
| 2° | 94.90% | 90.57% | 117.69% |
| 3° | 96.57% | 91.65% | 117.76% |
| 4° | 98.50% | 93.12% | 117.75% |
| 5° | 101.81% | 95.93% | 117.82% |
| 6° | 102.53% | 96.97% | 117.64% |
| 7° | 104.37% | 98.55% | 117.59% |
| 8° | 106.09% | 99.78% | 118.00% |
| 9° | 107.63% | 100.92% | 117.61% |
| 10° | 109.95% | 102.72% | 120.23% |

It can be seen that tine 100 generates a wider range of VSD options when compared to Tine A, while consistently and desirably generating a considerably larger SPA but a similar or much lesser SAD. The effect of these differences is that they enable an operator to employ the tine 100 and, by utilizing a swing angle, generate a greater range of soil disturbance options than is possible with the prior art tine. This desirable result is produced by a tine having less weight and without increased surface disturbance.

While particular embodiments of the present invention have been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiments. For example, it is well know in the art that different applications require different tine orientation factors such as lean, twist, and eccentricity, and operators manipulate the tines and the equipment bearing them to meet a given set of needs established by a particular context, so the tine orientation examples given above are therefore meant to be merely illustrative. The invention is therefore to be considered limited solely by the scope of the appended claims.

Embodiments of the invention in which an exclusive property or privilege is claimed are defined as follows:

1. A tine for mounting on a rotatable shaft of soil aeration and cultivation equipment, comprising:
   mounting means at an attachment end of the tine;
   a tip at a ground-engaging end of the tine opposite the attachment end;
   leading and trailing convex curvilinear edges disposed opposite each other and converging toward the attachment end and the tip; and
   first and second opposed faces substantially meeting at each of the leading and trailing convex curvilinear edges;
   wherein a centre line of the tine passes through, forwardly of, or rearwardly of, the axis of rotation of the rotatable shaft when the tine is mounted on the rotatable shaft; and
   wherein the tine exhibits a lean, such that the tine forms an angle of 0.5° to 15° with respect to a plane disposed perpendicular to the axis of rotation of the rotatable shaft when the tine is mounted on the rotatable shaft.

2. The tine of claim 1 wherein the tine exhibits a twist about the centre line of the tine, such that the tine forms an angle of 0.5° to 15° with respect to a plane containing the axis of rotation of the rotatable shaft when the tine is mounted on the rotatable shaft.

3. The tine of claim 1 wherein the tine exhibits a lean and twist about the centre line of the tine, such that the tine forms an angle of 0.5° to 15° with respect to a plane disposed perpendicular to the axis of rotation of the rotatable shaft and an angle of 0.5° to 15° with respect to a plane containing the axis of rotation of the rotatable shaft when the tine is mounted on the rotatable shaft.

4. The tine of claim 1 wherein the tine exhibits a lean and twist about the centre line of the tine, such that the tine forms an angle of 2.5° with respect to the plane disposed perpendicular to the axis of rotation of the rotatable shaft and an angle of 8° with respect to the plane containing the axis of rotation of the rotatable shaft when the tine is mounted on the rotatable shaft.

5. The tine of claim 1 wherein a centre line of the tine passes forwardly of the axis of rotation of the rotatable shaft when the tine is mounted on the rotatable shaft.

6. The tine of claim 5, the centre line of the tine and a line passing through the axis of rotation being substantially parallel and spaced apart, wherein the distance between the centre line and the line passing through the axis of rotation is approximately 0.75 inches.

7. The tine of claim 5 wherein the tine exhibits a lean and a twist about the centre line of the tine, such that the tine forms an angle of 2.5° with respect to the plane disposed perpendicular to the axis of rotation of the rotatable shaft and an angle of 8° with respect to the plane containing the axis of rotation of the rotatable shaft when the tine is mounted on the rotatable shaft.

8. The tine of claim 1 wherein a centre line of the tine passes rearwardly of the axis of rotation of the rotatable shaft when the tine is mounted on the rotatable shaft.

9. The tine of claim 8, the centre line of the tine and a line passing through the axis of rotation being substantially parallel and spaced apart, wherein the distance between the centre line and the line passing through the axis of rotation is approximately 0.75 inches.

10. The tine of claim 8 wherein the tine exhibits a lean and a twist about the centre line of the tine, such that the tine forms an angle of 2.5° with respect to the plane disposed perpendicular to the axis of rotation of the rotatable shaft and angle of 8° with respect to the plane containing the axis of rotation of the rotatable shaft when the tine is mounted on the rotatable shaft.

11. The tine of claim 1 wherein the mounting means comprise at least one bolt hole for receiving attachment bolts.

12. The tine of claim 1 wherein the tip comes to a sharp point.

13. The tine of claim 1 wherein the tip has a flat end.

14. The tine of claim 1 wherein the leading and trailing convex curvilinear edges are symmetrical about a centre line of the tine.

15. The tine of claim 4 a wherein the leading and trailing convex curvilinear edges are asymmetrical about a centre line of the tine.

16. The tine of claim 1 wherein at least one of the opposed faces comprises at least one bevelled section adjacent one of the leading and trailing convex curvilinear edges.

17. A rotatable shaft for mounting on soil aeration and cultivation equipment comprising at least one tine, the at least one tine comprising:
   mounting means at an attachment end of the at least one tine for mounting the at least one tine on the rotatable shaft;
   a tip at a ground-engaging end of the at least one tine opposite the attachment end;
   leading and trailing convex curvilinear edges disposed opposite each other and converging toward the attachment end and the tip; and
   first and second opposed faces substantially meeting at each of the leading and trailing convex curvilinear edges;
   wherein a centre line of the at least one tine passes through, forwardly of or rearwardly of the axis of rotation of the rotatable shaft; and
   wherein the at least one tine exhibits a lean, such that the at least one tine forms an angle of 0.5° to 15° with respect to a plane disposed perpendicular to the axis of rotation of the rotatable shaft.

18. The rotatable shaft of claim 17 wherein the at least one tine exhibits a twist about the centre line of the at least one tine, such that the at least one tine forms an angle of 0.5° to 15° with respect to a plane containing the axis of rotation of the rotatable shaft.

19. The rotatable shaft of claim 17 wherein the at least one tine exhibits a lean and a twist about the centre line of the at least one tine, such that the at least one tine forms an angle of 0.5° to 15° with respect to a plane disposed perpendicular to the axis of rotation of the rotatable shaft and an angle of 0.5° to 15° with respect to a plane containing the axis of rotation of the rotatable shaft.

20. The rotatable shaft of claim 19 wherein the at least one tine exhibits a lean and a twist about the centre line of the at least one tine, such that the one tine forms an angle of 2.5° with respect to the plane disposed perpendicular to the axis of rotation of the rotatable shaft and an angle of 8° with respect to the plane containing the axis of rotation of the rotatable shaft.

21. The rotatable shaft of claim 17 wherein a centre line of the at least one tine passes forwardly of the axis of rotation of the rotatable shaft.

22. The rotatable shaft of claim 17, the centre line of the at least one tine and a line passing through the axis of rotation being substantially parallel and spaced apart, wherein the distance between the centre line and the line passing through the axis of rotation is approximately 0.75 inches.

23. The rotatable shaft of claim 17 wherein the at least one tine exhibits a lean and a twist about the centre line of the at least one tine, such that the at least one tine forms an angle of 2.5° with respect to the plane disposed perpendicular to the axis of rotation of the rotatable shaft and an angle of 8° with respect to the plane containing the axis of the of rotation of the rotatable shaft.

24. The rotatable shaft of claim 17 wherein a centre line of the at least one tine passes rearwardly of the axis of rotation of the rotatable shaft.

25. The rotatable shaft of claim 24, the centre line of the at least one tine and a line passing through the axis of rotation being substantially parallel and spaced apart, wherein the distance between the centre line and the line passing through the axis of rotation is approximately 0.75 inches.

26. The rotatable shaft of claim 24 wherein the at least one tine exhibits a lean and a twist about the centre line of the at least one tine, such that the at least one tine forms an angle of 2.5° with respect to the plane disposed perpendicular to the axis of rotation of the rotatable shaft and an angle of 8° with respect to the plane containing the axis of rotation of the rotatable shaft.

27. The rotatable shaft of claim 24 wherein the mounting means comprise at least one bolt hole for receiving attachment bolts.

28. The rotatable shaft of claim 24 wherein the leading and trailing convex curvilinear edges are symmetrical about a centre line of the at least one tine.

29. The rotatable shaft of claim 24 wherein the leading and trailing convex curvilinear edges are asymmetrical about a centre line of the at least one tine.

30. The rotatable shaft of claim 24 wherein at least one of the opposed faces comprises at least one bevelled section adjacent one of the leading and trailing convex curvilinear edges.

31. The rotatable shaft of claim 17 wherein the rotatable shaft is disposed at a fixed angle of 0° to 10° to a line perpendicular to a direction of travel when the rotatable shaft is mourned on the soil aeration and cultivation equipment.

32. The rotatable shaft of claim 17 wherein the rotatable shaft is disposed at a variable angle of 0° to 10° to a line perpendicular to a direction of travel when the rotatable shaft is mounted on the soil aeration and cultivation equipment.

33. An apparatus for soil aeration and cultivation comprising at least one rotatable shaft having at least one tine, the soil aeration and cultivation equipment for moving in a direction of travel, the at least one tine comprising:
  mounting means at an attachment end of the at least one tine for mounting the at least one tine on the at least one rotatable shaft;
  a tip at a ground-engaging end of the at least one tine opposite the attachment end;
  leading and trailing convex curvilinear edges disposed opposite each other and converging toward the attachment end and the tip; and
  first and second opposed faces substantially meeting at each of the leading and trailing convex curvilinear edges;
  wherein a centre line of the at least one tine passes through, forwardly of, or rearwardly of, the axis of rotation of the at least one rotatable shaft; and
  wherein the at least one tine exhibits a lean, such that the at least one tine forms an angle of 0.5° to 15° with respect to a plane disposed perpendicular to the axis of rotation of the at least one rotatable shaft.

34. The apparatus of claim 33 wherein the at least one tine exhibits a twist about the centre line of the at least one tine, such that the at least one tine an angle of 0.5° to 15° with respect to a plane containing the axis of rotation of the at least one rotatable shaft.

35. The apparatus of claim 33 wherein the at least a tine exhibits a lean and a twist about the centre line of the at least one tine, such that the at least one tine forms an angle of 0.5° to 15° with respect to a plane disposed perpendicular to the axis of rotation of the at least one rotatable shaft and an angle of 0.5° to 15° with respect to a plane containing the axis of rotation of the at least one rotatable shaft.

36. The apparatus of claim 33 wherein the at least one tine exhibits a lean and a twist about the centre line of the at least one tine, such that the at least one tine forms an angle of 2.5° with respect to the plane disposed perpendicular to the axis of rotation of the at least one rotatable shaft and an angle of 8° with respect to the plane containing the axis of rotation of the at least one rotatable shaft.

37. The apparatus of claim 33 wherein a centre line of the at least one tine passes forwardly of the axis of rotation of the at least one rotatable shaft.

38. The apparatus of claim 37, the centre line of the at least one tine and a line passing through the axis of rotation being substantially parallel and space apart, wherein the distance between the centre line and the line passing through the axis of rotation is approximately 0.75 inches.

39. The apparatus of claim 37 wherein the at least one tine exhibits a lean and a twist about the centre line of the at least one tine, such that the at least one tine forms an angle of 2.5° with respect to the plane disposed perpendicular to the axis of the rotation of the at least one rotatable shaft and an angle of 8° with respect to the plane containing the axis of rotation of the at least one rotatable shaft.

40. The apparatus of claim 33 wherein a centre line of the at least one tine passes reawardly of the axis of rotation of the at least one rotatable shaft.

41. The apparatus of claim 40, the centre line of the at least one tine and a line passing through the axis of rotation being substantially parallel and spaced apart, wherein the distance between the centre line and the line passing through the axis of rotation is approximately 0.75 inches.

42. The apparatus of claim 40 wherein the at least one tine exhibits a twist about the centre line of the at least one tine, such that the at least one tine forms an angle of 0.5° to 15° with respect to a plane containing the axis of rotation of the at least one rotatable shaft.

43. The apparatus of claim 40 wherein the at least one tine exhibits a lean and a twist about the centre line of the at least one tine, such that the at least one tine forms an angle of 0.5° to 15° with respect to a plane disposed perpendicular to the axis of rotation of the at least one rotatable shaft and an angle of 0.5° to 15° with respect to a plane containing the axis of rotation of the at least one rotatable shaft.

44. The apparatus of claim 43 wherein the at least one tine exhibits a lean and a twist about the centre line of the at least one tine, such that the at least one tine forms an angle of 2.5° with respect to the plane disposed perpendicular to the axis of rotation of the at least one rotatable shaft and an angle of 8° with respect to the plane containing the axis of rotation of the at least one rotatable shaft.

45. The apparatus of claim 33 wherein the mounting means comprise at least one bolt hole for receiving attachment bolts.

46. The apparatus of claim 33 wherein the leading and trailing convex curvilinear edges are symmetrical about a centre line of the at least one tine.

47. The apparatus of claim 33 wherein The leading and trailing convex curvilinear edges are asymmetrical about a centre line of the at least one tine.

48. The apparatus of claim 33 wherein at least one of the opposed faces comprises at least one bevelled section adjacent one of the leading and trailing convex curvilinear edges.

49. The apparatus of claim 33 wherein the at least one rotatable shaft is disposed at a fixed angle of 0° to 10° to a line perpendicular to the direction of travel.

50. The apparatus of claim 33 wherein the at least one rotatable shaft is disposed at a variable angle of 0° to 10° to a line perpendicular to the direction of travel.

51. A tine for mounting on a rotatable shaft of soil aeration and cultivation equipment, comprising:
mounting means at an attachment end of the tine;
a tip at a ground-engaging end of the tine opposite the attachment end, tip having a flat end;
leading and trailing convex curvilinear edges disposed opposite other and converging toward the attachment end and the tip, the leading and trailing convex curvilinear edges being symmetrical about a centre line of the tine;
first and second opposed faces substantially meeting at each of the leading and trailing convex curvilinear edges; and
bevelled sections disposed on the first and second opposed faces adjacent each of the leading and trailing convex curvilinear edges;
wherein the centre line of the tine passes through the axis of rotation of rotatable shaft when the tine is mounted on the rotatable shaft, and the tine exhibits a lean and a twist about the centre line of the tine, such that the tine forms an angle of 2.5° with respect to a plane disposed perpendicular to the axis of rotation of the rotatable shaft and an angle of 8° respect to a plane containing the axis of rotation of the rotatable shaft when the tine is mounted on the rotatable shaft.

52. A tine for mounting on a rotatable shaft of soil aeration and cultivation equipment, comprising:
mounting means at an attachment end of the tine;
a tip at a ground-engaging end of the tine opposite the attachment end, the tip having a flat end;
leading and trailing convex curvilinear edges disposed opposite other and converging toward the attachment end and the tip, the leading and trailing convex curvilinear edges being asymmetrical about a centre line of the tine;
first and second opposed faces substantially meeting at each of the leading and trailing convex curvilinear edges; and
bevelled sections disposed on the first and second opposed faces adjacent each of the leading and trailing convex curvilinear edges;
wherein the centre line of the tine passes forwardly of the axis of rotation of the rotatable shaft when the tine is mounted on the rotatable shaft, and the tine exhibits a lean and a twist about the centre line of the tine, such that the tine forms an angle of 2.5° with respect to a plane disposed perpendicular to the axis of rotation of the rotatable shaft and an angle of 8° with respect to a plane containing the axis of rotation of the rotatable shaft when the tine is mounted on the rotatable shaft.

53. The tine of claim 52, the centre line of the tine and a line passing through the axis of rotation being substantially parallel and spaced apart, wherein the distance between the centre line and the line passing through the axis of rotation is 0.75 inches.

54. A tine for mounting on a rotatable shaft of soil aeration and cultivation equipment, comprising:
mounting means at an attachment end of the tine;
a tip at a ground-engaging end of the tine opposite the attachment end, the tip having a flat end;
leading and trailing convex curvilinear edges disposed opposite each other and converging toward the attachment end and the tip, the leading and trailing convex curvilinear edges being asymmetrical about a centre line of the tine;
first and second opposed faces substantially meeting at each of the leading and trailing convex curvilinear edges; and
bevelled sections disposed on the first and second opposed faces adjacent each of the leading and trailing convex curvilinear edges;
wherein the centre line of the tine passes rearwardly of the axis of rotation of the rotatable shaft when the tine is mounted on the rotatable shaft, and the tine exhibits a lean and a twist about the centre line of the tine, such that the tine forms an angle of 2.5° with respect to a plane disposed perpendicular to the axis of rotation of the rotatable shaft and an angle of 8° with respect to a plane containing the axis of rotation of the rotatable shaft when tine is mounted on the rotatable shaft.

55. The tine of claim 54, the centre line of the tine and a line passing through the axis of rotation being substantially parallel and spaced apart, wherein the distance between the centre line and the line passing through the axis of rotation is 0.75 inches.

56. A rotatable shaft for mounting on soil aeration and cultivation equipment, comprising at least one tine, the at least one tine comprising:
mounting means at an attachment end of the at least one tine for mounting the at least one tine on the rotatable shaft;
a tip at a ground-engaging end of the at least one tine opposite the attachment end, the tip having a flat end;
leading and trailing convex curvilinear edges disposed opposite each other and converging toward the attachment end and the tip, the leading and trailing convex curvilinear edges being symmetrical about a centre line of the at least one tine;
first and second opposed faces substantially meeting at each of the leading and trailing convex curvilinear edges; and
bevelled sections disposed on the first and second opposed faces adjacent each of the leading and trailing convex curvilinear edges;
wherein the centre line of the at least one tine passes through the axis of rotation of the rotatable shaft, and the at least one tine exhibits a lean and a twist about the centre line of the at least one tine, such that the at least one tine forms an angle of 2.5° with respect to a plane disposed perpendicular to the axis of rotation of the rotatable shaft and an angle 8° with respect to a plane containing the axis of rotation of the rotatable shaft.

57. A rotatable shaft for mounting on soil aeration and cultivation equipment, comprising at least one tine, the at least one tine comprising;
  mounting means at an attachment end of the at least one tine for mounting at least one tine on the rotatable shaft;
  a tip at a ground-engaging end of the at least one tine opposite the attachment end, the tip having a flat end;
  leading and trading convex curvilinear edges disposed opposite each other and converging toward the attachment end and the tip, the leading and trailing convex curvilinear edges being asymmetrical about a centre line of the at least one tine;
  first and second opposed faces substantially meeting at each of the lead and trailing convex curvilinear edges; and
  bevelled sections disposed on the first and second opposed faces adjacent each of the leading and trailing convex curvilinear edges;
  wherein the centre line of the at least one tine passes forwardly of the axis rotation of the rotatable shaft, and the at least one tine exhibits a lean and a twist about the centre line of the at least one tine, such that the at least one tine forms an angle of 2.5° with respect to a plane disposed perpendicular to the axis of rotation of the rotatable shaft and an angle of 8° with respect to a plane containing the axis of rotation of the rotatable shaft.

58. The rotatable shaft of claim 57, the centre line of the at least one tine and a line passing through the axis of rotation being substantially parallel spaced apart, wherein the distance between the centre line and the line passing through the axis rotation is 0.75 inches.

59. A rotatable shaft for mounting on soil aeration and cultivation equipment, comprising at least one tine, the at least one tine comprising:
  mounting means at an attachment end of the at least one tine for mounting the at least one tine on the rotatable shaft;
  a tip at a ground-engaging end of the at least one tine opposite the attachment end, the tip having a flat end;
  leading and trailing convex curvilinear edges disposed opposite each other and converging toward the attachment end and the tip, the leading and trailing convex curvilinear edges being asymmetrical about a centre line of the at least one tine;
  first and second opposed faces substantially meeting at each of the leading and trailing convex curvilinear edges; and
  bevelled sections disposed on the first and second opposed faces adjacent each of the leading and trailing convex curvilinear edges;
  wherein the centre line of the at least one tine passes rearwardly of the axis of rotation of the rotatable shaft and the at least one tine exhibits a lean and a twist about the centre line of the at least one tine, such that the at least one tine forms an angle of 2.5° with respect to a plane disposed perpendicular to the axis of rotation of the rotatable shaft and an angle of 8° with respect to a plane containing the axis of rotation of the rotatable shaft.

60. The rotatable shaft of claim 59, the centre line of the at least one tine and a line passing through the axis of rotation being substantially parallel and spaced apart, wherein the distance between the centre line and the line passing through the axis of rotation is 0.75 inches.

61. An apparatus for soil aeration and cultivation comprising at least one rotatable shaft having at least one tine, the soil aeration and cultivation equipment for moving in a direction of travel, the at least one rotatable shaft being disposed at an angle of 0° to 10° to a line perpendicular to the direction of travel, the at least one tine comprising:
  mounting means at an attachment end of the at least one tine for mounting the at least one tine on the at least one rotatable shaft;
  a tip at a ground-engaging end of the at least one tine opposite the attachment end, the tip having a flat end;
  leading and trailing convex curvilinear edges disposed opposite each other and converging toward the attachment end and the tip, the leading and trailing convex curvilinear edges being symmetrical about a centre line of the at least one tine;
  first and second opposed faces substantially meeting at each of the leading and trailing convex curvilinear edges; and
  bevelled sections disposed on the first and second opposed faces adjacent each of the leading and trailing convex curvilinear edges;
  wherein the centre line of the at least one tine passes through the axis of rotation of the at least one rotatable shaft, and the at least one tine exhibits a lean and a twist about the centre line of the at least one tine, such that the at least one tine forms an angle of 2.5° with respect to a plane disposed perpendicular to the axis of rotation of the at least one rotatable shaft and an angle of 8° with respect to a plane containing the axis of rotation of the at least one rotatable shaft.

62. An apparatus for soil aeration and cultivation comprising at least one rotatable shaft having at least one tine, the soil aeration and cultivation equipment for moving in a direction of travel, the at least one rotatable shaft being disposed at an angle of 0° to 10° to a line perpendicular to the direction of travel, the at least one tine comprising:
  mounting means at an attachment end of the at least one tine for mounting the at least one tine on the at least one rotatable shaft;
  a tip at a ground-engaging end of the at least one tine opposite the attachment end, the tip having a flat end;
  leading and trailing convex curvilinear edges disposed opposite each other and converging toward the attachment end and the tip, the leading and trailing convex curvilinear edges being asymmetrical about a centre line of the at least one tine;
  first and second opposed faces substantially meeting at each of the leading and trailing convex curvilinear edges; and
  bevelled sections disposed on the first and second opposed faces adjacent each of the leading and trailing convex curvilinear edges;
  wherein the centre line of the at least one tine passes forwardly of the axis of rotation of the at least one rotatable shaft, and the at least one tine exhibits a lean and a twist about the centre line of the at least one tine, such that the at least one tine forms an angle of 2.5° with respect to a plane disposed perpendicular to the axis of rotation of the at least one rotatable shaft and an angle of 8° with respect to a plane containing the axis of rotation of the at least one rotatable shaft.

63. The apparatus of claim 62, the centre line of the at least one tine and a line passing through the axis of rotation being substantially parallel and spaced apart, wherein the distance between the centre line and the line passing through the axis of rotation is 0.75 inches.

64. An apparatus for soil aeration and cultivation comprising at least one rotatable shaft having at least one tine, the soil aeration and cultivation equipment for moving in a direction of travel, the at least one rotatable shaft being disposed at an angle of to 10° to a line perpendicular to the direction of travel, the at least one tine comprising:

mounting means at an attachment end of the at least one tine for mounting the at least one tine on the at least one rotatable shaft;

a tip at a ground-engaging end of the at least one tine opposite the attachment end, the tip having a flat end;

leading and trailing convex curvilinear edges disposed opposite each other and converging toward the attachment end and the tip, the leading and trailing convex curvilinear edges being asymmetrical about a centre line of the at least one tine;

first and second opposed faces substantially meeting at each of the leading and trailing convex curvilinear edges; and bevelled sections disposed on the first and second opposed faces adjacent each of the leading and trailing convex curvilinear edges;

wherein the centre line of the at least one tine passes rearwardly of the axis of rotation of the at least one rotatable shaft, and the at least one tine exhibits a lean and a twist about the centre line of the at least one tine, such that the at least one tine forms an angle of 2.5° with respect to a plane disposed perpendicular to the axis of rotation of the at least one rotatable shaft and an angle of 8° with respect to a plane containing the axis of rotation of the at least one rotatable shaft.

65. The apparatus of claim 64, the centre line of the at least one tine and a line passing through the axis of rotation being substantially parallel and spaced apart, wherein the distance between the centre line and the line passing through the axis of rotation is 0.75 inches.

* * * * *